(12) United States Patent
Kurosaki (10) Patent No.: US 6,177,155 B1
(45) Date of Patent: *Jan. 23, 2001

(54) TRIM ASSEMBLY FOR VEHICLE AND METHOD FOR MANUFACTURING THE SAME

(75) Inventor: Hideyuki Kurosaki, Shioya-gun (JP)

(73) Assignee: TS Tech Co., Ltd., Asaka (JP)

( * ) Notice: Under 35 U.S.C. 154(b), the term of this patent shall be extended for 0 days.

This patent is subject to a terminal disclaimer.

(21) Appl. No.: 09/166,194

(22) Filed: Oct. 5, 1998

(30) Foreign Application Priority Data

May 29, 1998 (JP) .................................................. 10-149976

(51) Int. Cl.⁷ .................................................. B60R 13/00
(52) U.S. Cl. ............................ 428/31; 428/121; 428/122; 428/123; 428/124; 428/126; 296/146.7; 112/440; 297/452.38; 52/716.5
(58) Field of Search .............................. 428/31, 122, 121, 428/123, 124, 126; 296/146.7, 39.1; 52/716.5, 716.6, 716.01, 718.01; 112/440, 441; 297/452.38; 280/751

(56) References Cited

U.S. PATENT DOCUMENTS

| | | |
|---|---|---|
| 1,675,998 | 7/1928 | Walters . |
| 1,929,590 | 10/1933 | Krentler . |
| 2,576,121 | 11/1951 | Kamborian . |

FOREIGN PATENT DOCUMENTS

| | | |
|---|---|---|
| 387420 | 1/1924 | (DE) . |
| 1 039 355 | 9/1958 | (DE) . |
| 0 543 066 A1 | 5/1993 | (EP) . |

Primary Examiner—Deborah Jones
Assistant Examiner—Abraham Bahta
(74) Attorney, Agent, or Firm—Oliff & Berridge, PLC

(57) ABSTRACT

A trim assembly 40 for a vehicle comprising: a top cover 10 comprising gather-sewn peripheral portions 12 and 13 to form gather-sewn portions 15; a plate-like base member 20, to which the peripheral portions 12 and 13 of the top cover 10 are sewn on peripheral portions 22 and 23 of the base member to form sewn portions 26; and a cushion member inserted between the plate-like base member 20 and the top cover 10; wherein a gather-sewn upper peripheral portion 12 of the top cover 10 is overlapped and sewn on an upper peripheral portion on a body side surface of the base member 20 to form a sewn portion 26, the overlapped and sewn top cover 10 is turned over upwardly and further turned over beyond an upper edge of the base member 20 so as to face a room side surface of the base member 20, a gather-sewn lower peripheral portion 13 of the further turned top cover 10 is overlapped and sewn on a lower peripheral portion on the room side surface of the base member 20 to form a sewn portion 26, and the lower peripheral portion 23 of the base member 20 is turned back onto the body side surface of the base member 20 to form a lower peripheral turned back portion 29 and is fastened to the body side surface of the base member together with the sewn lower peripheral portion of the top cover 10 by tucking or stapling 34.

10 Claims, 8 Drawing Sheets

TRIM ASSEMBLY FOR VEHICLE AND METHOD FOR MANUFACTURING THE SAME

BACKGROUND OF THE INVENTION

1. Field of the Invention

The present invention relates to a trim assembly for a vehicle, which has a gathered top cover made of natural leather or the like and a method for manufacturing the same.

2. Description of Related Art

In a door lining or trim panel for a vehicle, a trim assembly (pad) having a gathered top cover made of natural leather or the like to improve luxurious feeling for aesthetic appearance has been known.

Figure 11:
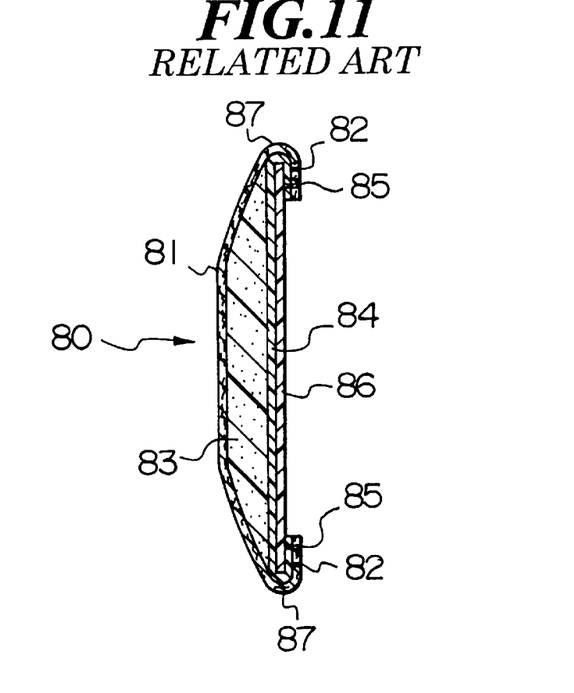
FIG. 11 is a vertical sectional view showing a trim assembly for a vehicle having a gathered top cover according to an example of an earlier technology.

FIG. 11 shows a trim assembly (pad) having a gathered top cover according to an example of an earlier technology. Such an earlier door lining assembly (pad) or a trim panel assembly (pad) 80 for a door lining or a trim panel for a vehicle is manufactured by gather-sewing peripheral portions of a top cover 81 to form gather-sewn portions 82, sewing the peripheral portions of the top cover 81 to form sewn portions 85 on peripheral portions of one-piece cardboard or pasteboard 84 to a room side surface to which polyurethane foam 83 for a cushion member is fastened, turning back both of the peripheral portions, of the top cover 81 and the cardboard or pasteboard 84 to form turned back portions 87 so as to wrap the peripheral portions of a resin attachment base 86, and subsequently bonding both of the turned peripheral portions, of the top cover 81 and the cardboard or pasteboard 84 to a body side surface of the resin attachment base 86.

Figure 12:
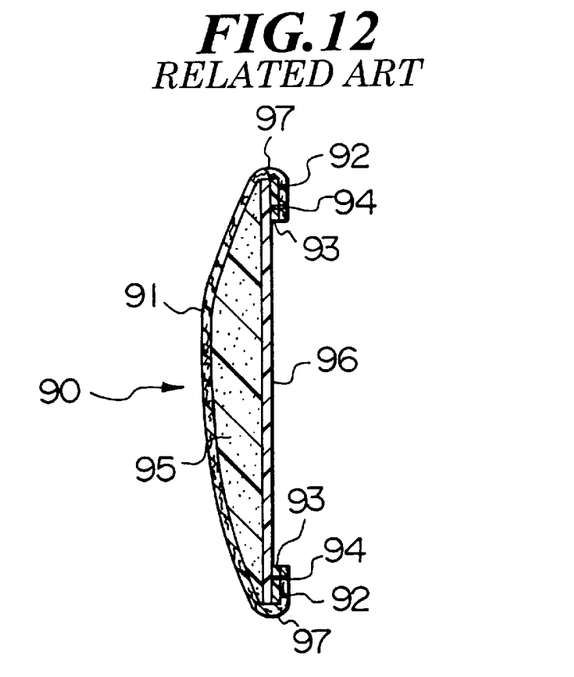
FIG. 12 is a vertical sectional view showing a trim assembly for a vehicle having a gathered top cover according to another example of an earlier technology, which is different from the one shown in FIG. 11.

FIG. 12 shows a trim assembly (pad) having a gathered top cover according to another embodiment of an earlier technology. Another earlier door lining assembly (pad) or trim panel assembly (pad) 90 for a door lining or a trim panel for a vehicle is manufactured by gather-sewing peripheral portions of a top cover 91 to form gather-sewn portions 92, sewing belt shaped cardboard or pasteboard 93 on the gather-sewn peripheral portions of the top cover to form sewn portions 94, the belt shaped cardboard or pasteboard 93 be divided into plurality, turning back the peripheral portions of the top cover 91 to a body side surface of a resin attachment base 96 to form turned back portions 97 so as to wrap the peripheral portions of the resin attachment base 96, on the room side surface of which polyurethane foam 95 is fastened, and bonding the turned peripheral portions of the top cover 91 on the body side surface of the resin attachment base 96.

However, there are problems in above-described earlier trim assemblies for a door lining or a trim panel for a vehicle from a manufacturing standpoint.

In the earlier door lining assembly or trim panel assembly 80 for a door lining or a trim panel for a vehicle, as shown in FIG. 11, when turning back both of the peripheral portions, of the top cover 81 and the cardboard or pasteboard 84 to the body side surface of the resin attachment base 86 to form the turned back portions 87 so as to wrap the peripheral portions of the resin attachment base 86, and bonding both of the turned peripheral portions, of the top cover 81 and the cardboard or pasteboard 84 on the peripheral portions on the body side surface of the resin attachment base 86, because the peripheral portions of the resin attachment base 86 has curve for the purpose of aesthetic appearance, it is difficult to turn back both of the peripheral portions, of the top cover 81 and the cardboard or the pasteboard 84 to form the turned back portions 87 so as to wrap the curved peripheral portions of the resin attachment base 86. As the result, a shape of the peripheral portions of the door lining assembly or the trim panel assembly 80 is not stylish. Further, when the cardboard or the pasteboard 84 is turned back to the body side surface of the resin attachment base 86 to put the curved peripheral portions of the resin attachment base 86 between the body side surface of the cardboard or the pasteboard 84 and turned peripheral portions of the cardboard or the pasteboard 84, because undesired wrinkles are made, shapes of gathers in lengthwise on the top cover 81 are floating.

In the another earlier door lining assembly or the trim panel assembly 90 for a door lining or a trim panel for a vehicle, as shown in FIG. 12, shapes of gathers in lengthwise on the top cover 91 are floating when positions of the upper and lower belt shaped cardboard or the pasteboard 93 bonded on the peripheral portions of the resin attachment base 96 are not trued up. It is difficult to bond the belt shaped cardboard or pasteboard 93 on the peripheral portions of the resin attachment base 96, with truing up the positions of the upper and lower belt shaped cardboard or pasteboard 93 completely, because sizes and shapes of members are not uniform and the door lining assembly or the trim panel assembly 90 is manufactured by handiwork.

SUMMARY OF THE INVENTION

The present invention has been developed in view of these problems.

An object of the present invention is to provide a trim assembly for a vehicle, which has a top cover having gathers formed easily and firmly, and a work for assembling the one requires short time.

Another object of the present invention is to provide a method for manufacturing the same.

In order to accomplish the above objects, in accordance with one aspect of the invention, a trim assembly for a vehicle comprises: a top cover comprising a gather-sewn peripheral portion; a plate-like base member, to which the peripheral portion of the top cover is sewn on a peripheral portion of the base member; and a cushion member inserted between the plate-like base member and the top cover; wherein an upper part of the gather-sewn peripheral portion of the top cover is overlapped and sewn on an upper peripheral portion on a body side surface of the base member, the overlapped and sewn top cover is turned over upwardly and further turned over beyond an upper edge of the base member so as to face a room side surface of the base member, a lower gather-sewn peripheral portion of the further turned top cover is overlapped and sewn on a lower peripheral portion on the room side surface of the base member, and the lower peripheral portion of the base member is turned back onto and fastened to the body side surface of the base member together with the sewn lower peripheral portion of the top cover.

The trim assembly can be used for a door lining assembly (pad) or a trim panel assembly (pad) for a door panel of a vehicle. The trim assembly also can be used for a side lining assembly (pad) for a body side molding, and the like.

In particular, the top cover can comprise natural leather formed from a cowhide, horse hide or other animal hide. It can be also used artificial leather, cloth made of fibers, or the like therefor.

The plate-like base member can comprise cardboard or pasteboard. Thin resin, comparatively rigid resin, and the like can be also used therefor.

As described above, according to the trim assembly, because after the upper part of the gather-sewn peripheral portion of the top cover is overlapped and sewn on the upper peripheral portion on the body side surface of the base member, the overlapped and sewn top cover is turned over upwardly and further turned over beyond the upper edge of the base member so as to face the room side surface of the base member, and the lower gather-sewn peripheral portion of the further turned top cover is overlapped and sewn on the lower peripheral portion on the room side surface of the base member, the lower peripheral portion of the base member can be turned back onto and fastened to the body side surface of the base member together with the sewn lower peripheral portion of the top cover. As the result, it is possible to form the gathers easily, and the work for assembling the trim assembly requires short time. Further, because the cushion member is inserted between the plate-like base member and the top cover, tension of the top cover is uniform thereby. Therefore, it is possible to uniformly form the gathers on the top cover.

The cushion member can comprise a plate-like attachment base for securing the trim assembly to a body of the vehicle, and a cushion material fastened to the attachment base. For the plate-like attachment base, polypropylene can be used. However, another rigid resin can be also used therefor.

The cushion material can comprise foamed resin which is polyurethane foam or the like. Another material can be also used for the cushion material.

According to the trim assembly, because the cushion member comprises the plate-like attachment base for securing the trim assembly to the body of the vehicle, and the cushion material fastened to the attachment base, it is possible to attach the trim assembly to the body of the vehicle by using the attachment base.

The cushion member can comprise a slippery layer which makes the top cover easy to slip on a surface of the cushion material. For the slippery layer, cloth made of nylon or the like or span bond which is made of non-woven cloth can be used. Another material can be also used, and coated layer for slipping may be used for the slippery layer.

According to the trim assembly, because the slippery layer which makes the top cover easy to slip is formed on the surface of the cushion material, the top cover can be slippery against the cushion member. As the result, it is possible to keep the uniformly formed gathers on the top cover.

The plate-like attachment base may comprise a plurality of hooks for securing the trim assembly to the body of the vehicle, while a plurality of holes may be formed in the base member for the hooks to project through the holes so as to secure the trim assembly to the body. Each hook may comprise a shape like a "T", in cross section.

According to the trim assembly, because the plate-like attachment base comprises the plurality of hooks for securing the trim assembly to the body of the vehicle, and the plurality of holes are formed in the base member for the hooks to project through the holes so as to secure the trim assembly to the body, it is possible to easily attach the trim assembly to the body of the vehicle by using the attachment base. Further, because the hooks comprise a shape like the "T", in cross section, it can be possible to position the trim assembly to the body of the vehicle by easy operation.

In accordance with another aspect of the invention, a method for manufacturing a trim assembly for a vehicle, comprises the steps of: gather-sewing a peripheral portion of a top cover; forming the top cover and a plate-like base member into a bag-like member by overlapping and sewing an upper part of the gather-sewn peripheral portion of the top cover on an upper peripheral portion on a body side surface of the base member, turning over the overlapped and sewn top cover upwardly and further turning over beyond an upper edge of the base member so as to face a room side surface of the base member, and overlapping and sewing a lower gather-sewn peripheral portion of the further turned top cover on a lower peripheral portion on the room side surface of the base member; inserting a cushion member into an inside of the bag-like member; turning back the lower peripheral portion of the base member onto the body side surface of the base member together with the sewn lower peripheral portion of the top cover; and fastening the turned back lower peripheral portion of the base member to the body side surface of the base member together with the sewn lower peripheral portion of the top cover.

In this case, the gather-sewing and the sewing are carried out by using a sewing machine.

The fastening can be carried out by tucking or stapling, for example. The fastening can be also carried out by bonding.

According to the method, because after the upper part of the gather-sewn peripheral portion of the top cover is overlapped and sewn on the upper peripheral portion on the body side surface of the base member, the overlapped and sewn top cover is turned over upwardly and further turned over beyond the upper edge of the base member so as to face a room side surface of the base member, and the lower gather-sewn peripheral portion of the further turned top cover is overlapped and sewn on the lower peripheral portion on the room side surface of the base member, the lower peripheral portion of the base member can be turned back onto and fastened to the body side surface of the base member together with the sewn lower peripheral portion of the top cover. As the result, it is possible to form the gathers easily, and the work for assembling the trim assembly requires short time. Further, because the cushion member is inserted between the plate-like base member and the top cover, tension of the top cover is uniform thereby. Therefore, it is possible to uniformly form the gathers on the top cover.

The method can further comprise a step for previously forming a fold on the base member to make the lower peripheral portion of the base member easy to be turned back to a body side, together with the lower peripheral portion of the top cover sewn thereto.

According to the method, because the fold can be previously formed on the base member to make the lower peripheral portion thereof easy to be turned back to the body side, it can be possible to easily turn back the lower peripheral portion of the base member together with the lower peripheral portion of the top cover sewn thereto, to the body side along the fold.

In accordance with further aspect of the invention, a trim assembly for a vehicle comprises: a top cover comprising a gather-sewn peripheral portion; a plate-like base member, to which the peripheral portion of the top cover is sewn on a peripheral portion of the base member; and a cushion member inserted between the plate-like base member and the top cover; wherein an upper part of the gather-sewn peripheral portion of the top cover is overlapped and sewn on an upper peripheral portion on a body side surface of the base member, the overlapped and sewn top cover is turned over upwardly and further turned over beyond an upper edge of the base member so as to face a room side surface of the base member, a lower gather-sewn peripheral portion of the further turned top cover is overlapped and sewn on a lower peripheral portion on the room side surface of the base member.

According to the trim assembly, after the upper part of the peripheral portion of the top cover is overlapped and sewn on the upper peripheral portion on the body side surface of the base member, the overlapped and sewn top cover can be turned over upwardly and further turned over beyond the upper edge of the base member so as to face the room side surface of the base member and thereafter the lower gather-sewn peripheral portion of the further turned top cover can be overlapped and sewn on the lower peripheral portion on the room side surface of the base member. As the result, it is not required to be turned back the upper peripheral portion of the base member to the body side thereof. Therefore, it is possible to make the upper peripheral portion of the trim assembly thin and to make a step for manufacturing the trim assembly easy.

BREIF DESCRIPTION OF THE DRAWINGS

The above and other objects, features and advantages of the invention will become more apparent from the following description taken in conjunction with the accompanying drawings wherein like references refer to like parts and wherein:

FIGS. 1A and 1B show a member of the door lining assembly or trim panel assembly, of a trim assembly for a vehicle according to an embodiment of the present invention; wherein

PREFFERED EMBODIMENT OF THE INVENTION

The embodiment of the trim assembly for a vehicle and the method manufacturing such a trim assembly, in accordance with the present invention will be explained with reference to FIGS. 1A to 10.

Figure 1A:
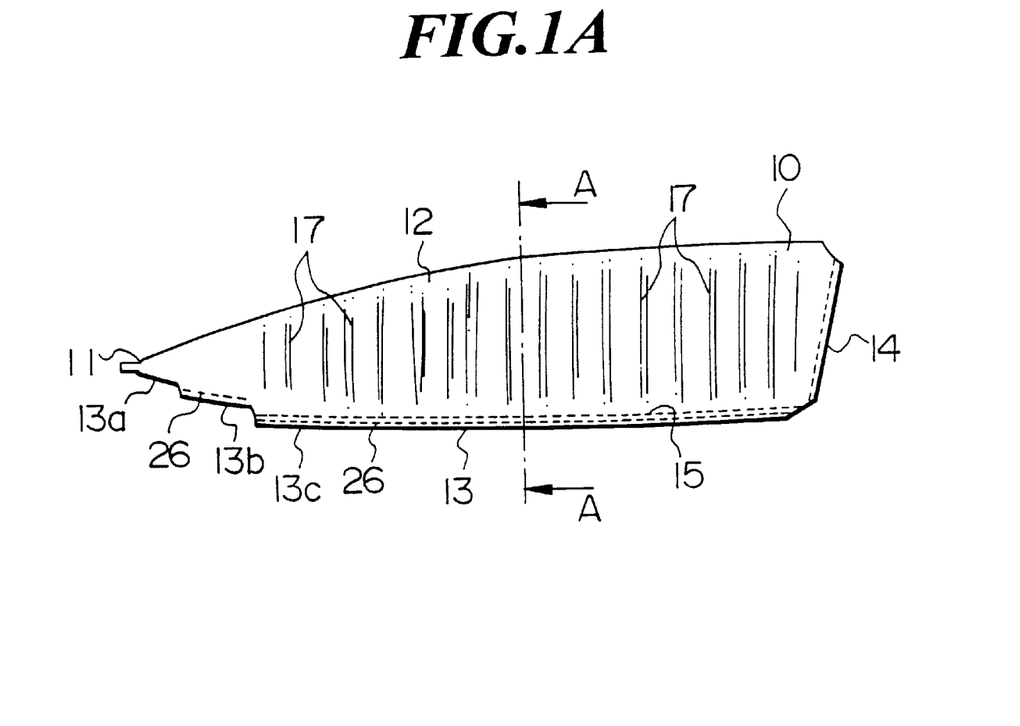
FIG. 1A is a front view of a bag-like member which is illustrated from the room side of the vehicle.
Figure 1B:
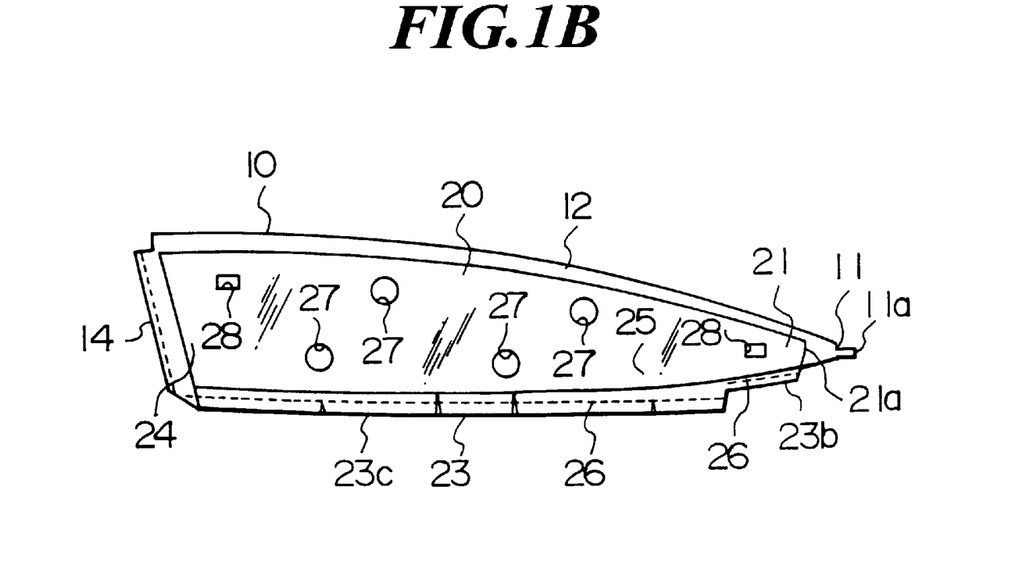
FIG. 1B is a rear view of the bag-like member which is illustrated from the body side of the vehicle.
Figure 2:
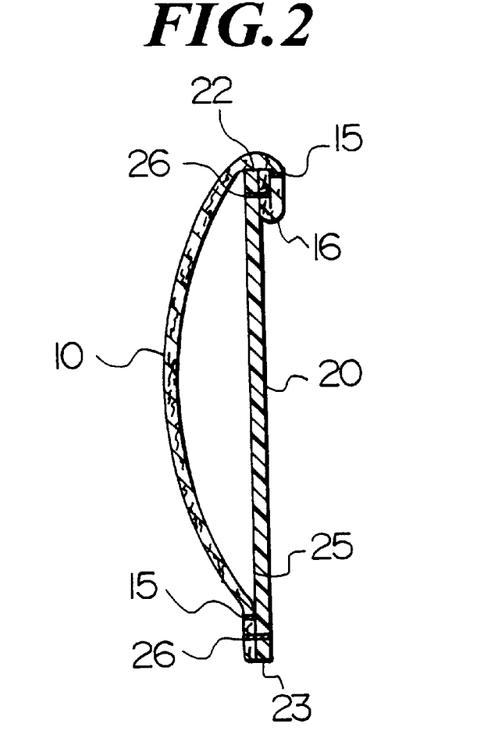
FIG. 2 is a cross-sectional view taken along the line A—A of FIG. 1A looking in the direction of the arrows.

FIGS. 1A and 1B show a member of the door lining assembly or the trim panel assembly, of a trim assembly for a vehicle according to an embodiment of the present invention; wherein FIG. 1A is a front view of a bag-like member which is illustrated from the room side of the vehicle, and FIG. 1B is a rear view of the bag-like member which is illustrated from the body side of the vehicle. FIG. 2 is a cross-sectional view taken along the line A—A of FIG. 1A looking in the direction of the arrows.

The trim assembly for a vehicle according to the embodiment comprises a top cover 10, a plate-like base member 20, and a cushion member inserted between them.

The top cover 10 is made of natural leather. The periphery of the top cover 10 comprises an upper peripheral portion 12 and a lower peripheral portion 13, which extend from a tapered front portion 11 toward the rear side in upper and lower sides, respectively, and a rear peripheral portion 14 which connects the rear ends of the upper and lower peripheral portions 12 and 13, as shown in FIGS. 1A and 1B. The upper peripheral portion 12 has an approximately continuous arc shaped edge line extending from the tapered front portion 11 to the rear end. The tapered front portion 11 comprises a small projecting portion 11a which projects in a front direction. The lower peripheral portion 13 comprises a first sloped peripheral portion 13a extending in the rear and a little lower direction from the tapered front portion 11, a second sloped peripheral portion 13b which goes down a step from the first sloped peripheral portion 13a and extends in the rear direction, and a straight shaped portion 13c which goes down a step from the second sloped peripheral portion 13b and extends in the rear direction to connect a lower end of the rear peripheral portion 14. The rear peripheral portion 14 connects to the rear ends, of the upper peripheral portion 12 and the straight shaped portion 13c, respectively.

A gather-sewing is carried out on the top cover along the upper peripheral portion 12 and the straight shaped portion 13c, except the first sloped peripheral portion 13a and the second sloped peripheral portion 13b, to form gather-sewn portions 15 shown in FIGS. 1A and 2.

The periphery of the cardboard or pasteboard 20 which is for a plate-like base member comprises an upper peripheral portion 22, a lower peripheral portion 23, and a rear peripheral portion 24. The upper peripheral portion 22 has an approximately continuous arc shaped edge line extending from a tapered front portion 21 to the rear end. The tapered front portion 21 comprises a straight shaped front end portion 21a. The lower peripheral portion 23 comprises a sloped peripheral portion 23b and a straight shaped portion 23c which goes down a step from the sloped peripheral portion 23b and extends in the rear direction to connect a lower end of the rear peripheral portion 24. The rear peripheral portion 24 connects to the rear ends, of the upper peripheral portion 22 and the straight shaped portion 23c, respectively.

A fold 25 is formed in the cardboard or the pasteboard 20 in arc shaped along upper portions of the sloped peripheral portion 23b and the straight shaped portion 23c.

The upper peripheral portion 12 of the top cover 10 is overlapped and sewn on a body side surface of the upper peripheral portion 22 of the cardboard or the pasteboard 20, with truing up the upper edges of the top cover 10 and the base member 20, to form a sewn portion 26. Thereafter, the top cover 10 is turned over upwardly and further turned over beyond an upper edge of the base member so as to face a room side surface of the cardboard or the pasteboard 20 to form an upper turned over peripheral portion 16. Then, the straight shaped portion 13c of the further turned top cover 10 is overlapped and sewn on the room side surface of the straight shaped portion 23c of the cardboard or the pasteboard 20 together to form a sewn portion 26. The sloped peripheral portion 23b of the cardboard or the pasteboard 20 and the second sloped peripheral portion 13b of the top cover 10 are also sewn to form the sewn portions 26.

As the result, a bag-like member wherein the rear peripheral portions 14 and 24 are open is formed by the top cover 10 and the cardboard or the pasteboard 20. In this state, a large number of gathers 17 in lengthwise are formed on the top cover 10.

A large number of hole portions 27 and 28 are formed in the cardboard or the pasteboard 20.

Figure 3:
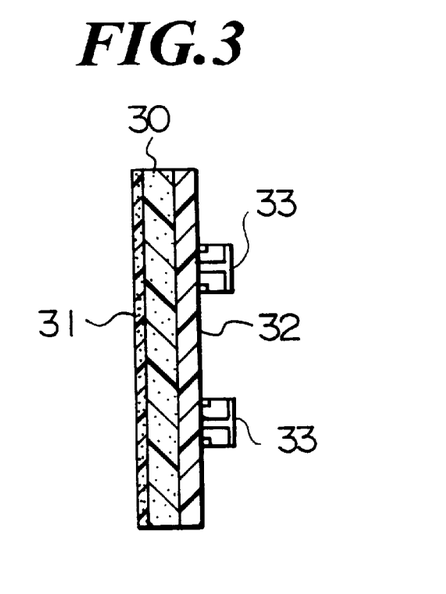
FIG. 3 is a vertical sectional view of an embodiment of the cushion member to be inserted into the bag-like member shown in FIGS. 1A and 1B.
Figure 6:
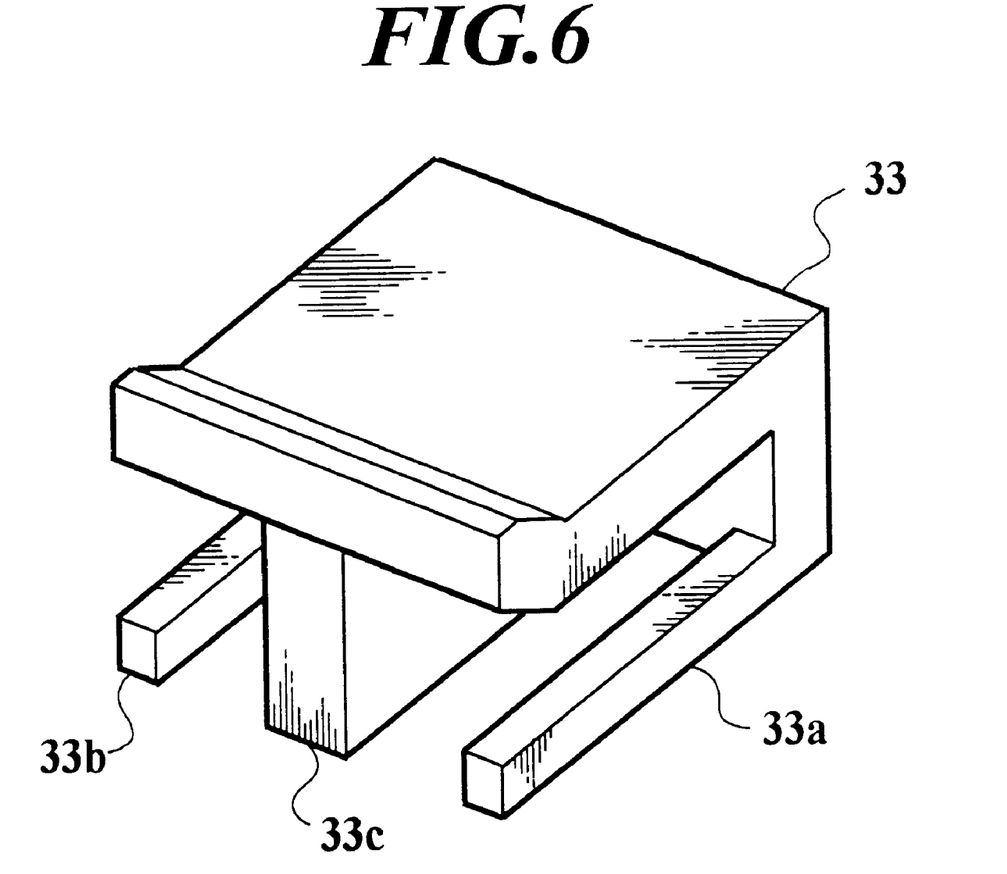
FIG. 6 is an enlarged detail of a hook of the door lining assembly or trim panel assembly, as shown in FIG. 3.

FIG. 3 shows a cushion member which is inserted into an inside of the bag-like member according to the embodiment. The cushion member comprises a cushion material 30, a slippery layer 31 formed on the cushion material 30, and a plate-like attachment base 32 for mounting the cushion material 30. The cushion material 30 comprises, for example, polyurethane foam which has a thickness of about 8 millimeters. On a surface of the cushion material 30, the surface layer 31 which comprises cloth made of nylon or spun bond made of non-woven cloth is provided by bonding and the like. The cushion material 30 and a plate-like attachment base 32 which comprises rigid resin like polypropylene for example are made as a body by bonding or the like. A large number of hooks 33 are provided on a body side surface of the attachment base 32, as shown in FIG. 3. Each hooks 33 comprises a shape like a "T", in cross section, as shown in FIG. 6. The hooks 33 have bars 33a and 33b in both right and left end sides thereof.

The cushion member which comprises the cushion material 30, the slippery layer 31 and the attachment base 32 has a shape suitable to be inserted into the inside of the bag-like member which is made of the top cover 10 and the cardboard or the pasteboard 20.

Figure 4:
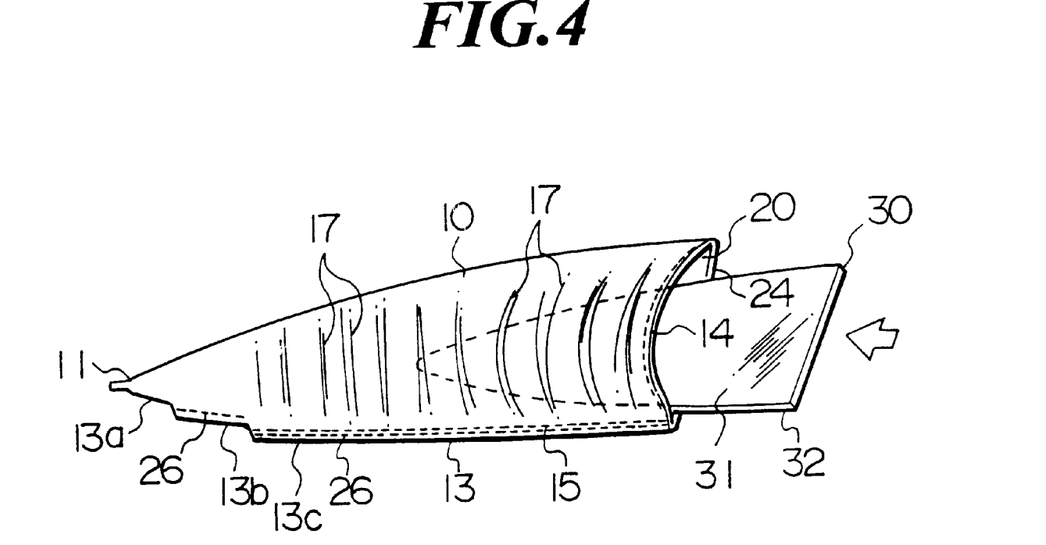
FIG. 4 is a perspective view showing a state of inserting the cushion member shown in FIG. 3 into the bag-like member.

The cushion member is inserted into the inside of the bag-like member from the opening portion at the rear peripheral portions 14 and 24, as shown in FIG. 4. Then, the hooks 33 on the body side surface of the attachment base 32 are projected through each hole portion 27 and 28 of the cardboard or the pasteboard 20.

Figure 5:
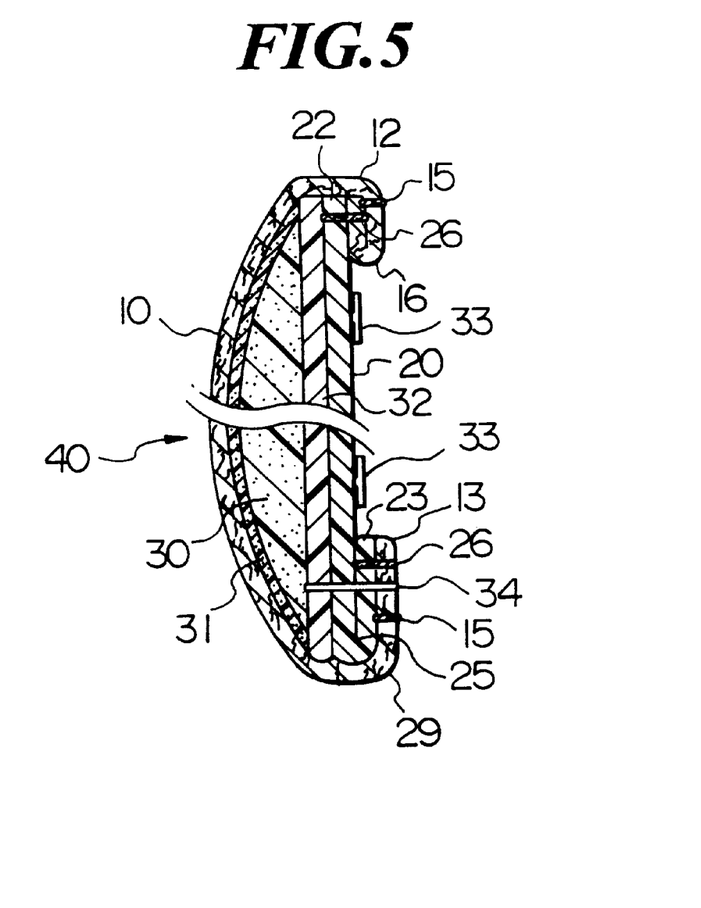
FIG. 5 is a vertical sectional view showing a completed state of the door lining assembly or trim panel assembly according to the embodiment.

The lower peripheral portion 13 of the top cover 10 and the lower peripheral portion 23 of the cardboard or the pasteboard 20 are turned back onto the body side surface of the cardboard or the pasteboard 20 to form a lower peripheral turned back portion 29, along the fold 25 which is formed in the cardboard or the pasteboard 20, thereafter the lower peripheral turned back portion 29 is fastened to the body side surface of the cardboard or the pasteboard 20 by tucking or stapling 34, as shown in FIG. 5.

The rear peripheral portion 14 of the top cover 10 is also turned back onto the body side surface of the rear peripheral portion 24 of the cardboard or the pasteboard 20 and fastened thereto by tucking or stapling. The small projecting portion 11a of the tapered front portion 11 of the top cover 10 is also turned back onto a body side surface of the tapered front portion 21 of the cardboard or the pasteboard 20 and fastened thereto by tucking or stapling 34. As the result, a door lining assembly (pad) or a trim panel assembly (pad) 40 can be manufactured.

Figure 9:
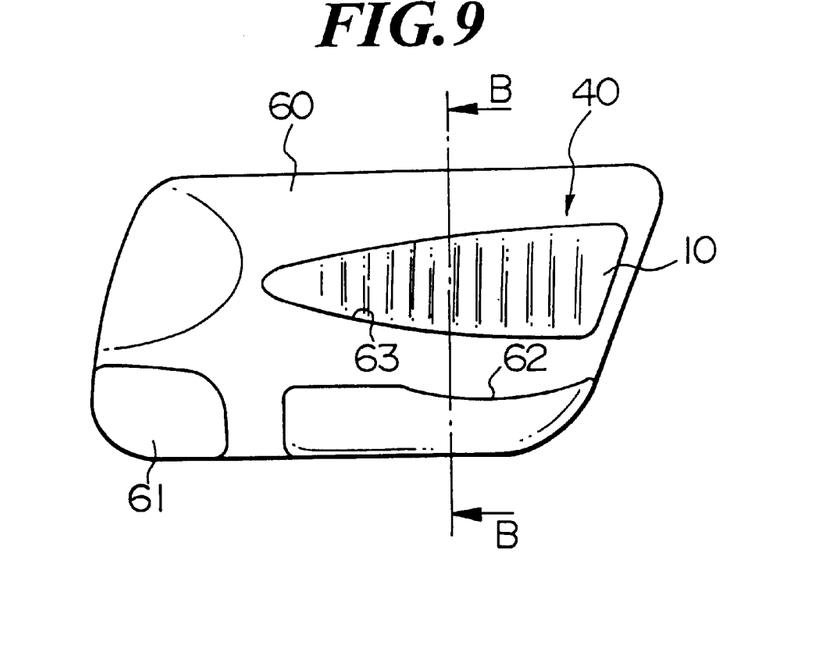
FIG. 9 is a schematic front view showing an embodiment of an attachment of the door lining assembly or trim panel assembly to the door lining or trim panel.
Figure 10:
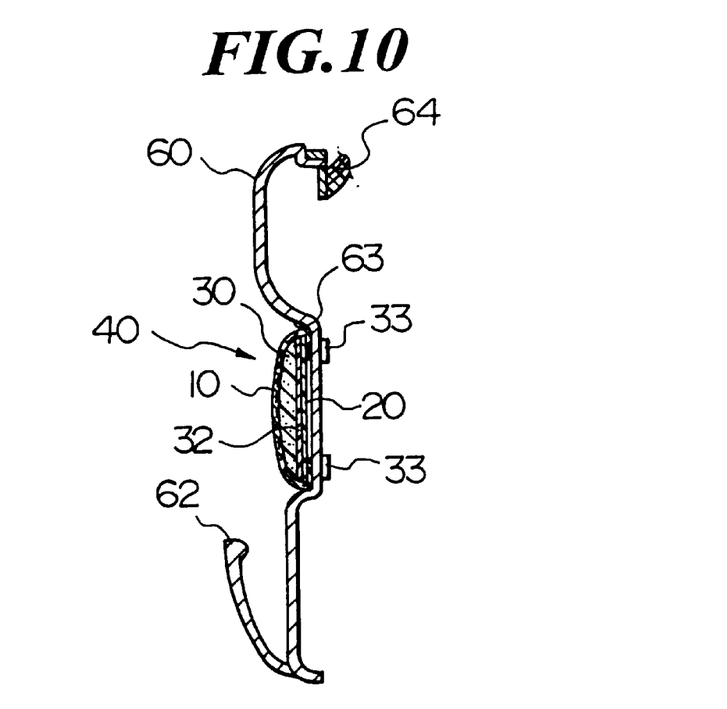
FIG. 10 is a cross-sectional view taken along the line B—B of FIG. 9 looking in the direction of the arrows.

The door lining assembly or the trim panel assembly 40 is attached to a door lining or a trim panel 60, as shown in FIGS. 9 and 10.

Figure 7:
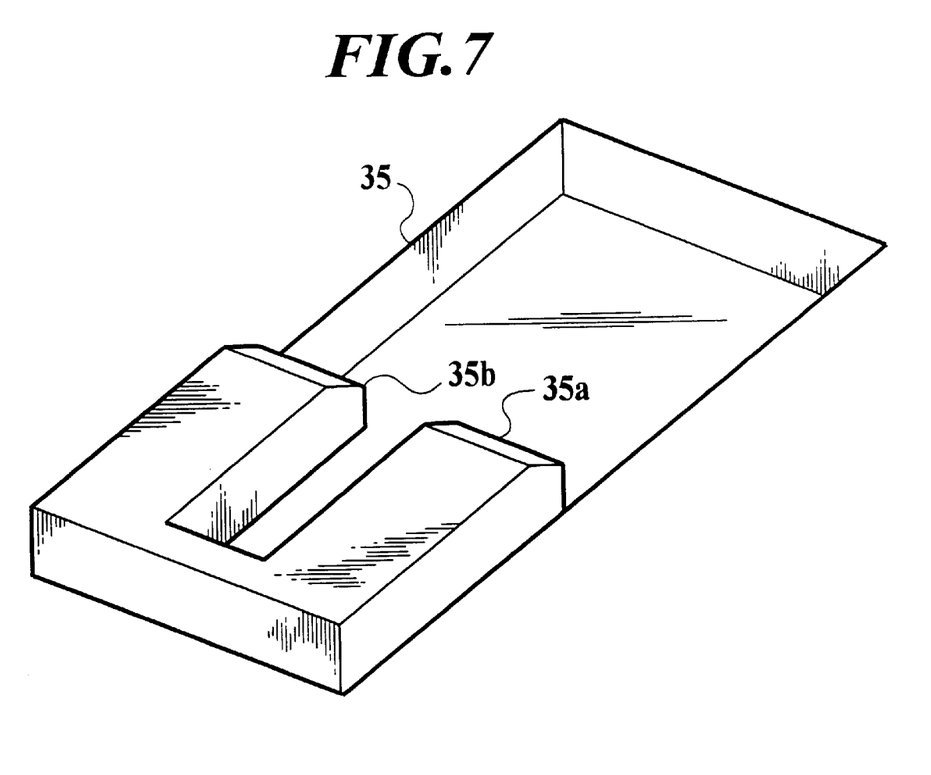
FIG. 7 is an enlarged detail of a slide hole portion of the door lining or trim panel, for attaching the hook.

The door lining or the trim panel 60 comprises a speaker 61 and an accessory pocket 62 on a lower portion thereof. An assembly attachment recess portion 63 is formed along an upper side of the accessory pocket 62. An inner shield or a whether strip 64 is provided to the door lining or the trim panel 60 along an upper peripheral portion of the door lining or the trim panel 60. A plurality of slide hole portions 35 are formed on the assembly attachment recess portion 63. Each slide hole portions 35 has a concave portion. That is, Each slide hole portions 35 has two convex portions 35a and 35b, as shown in FIG. 7.

Figure 8:
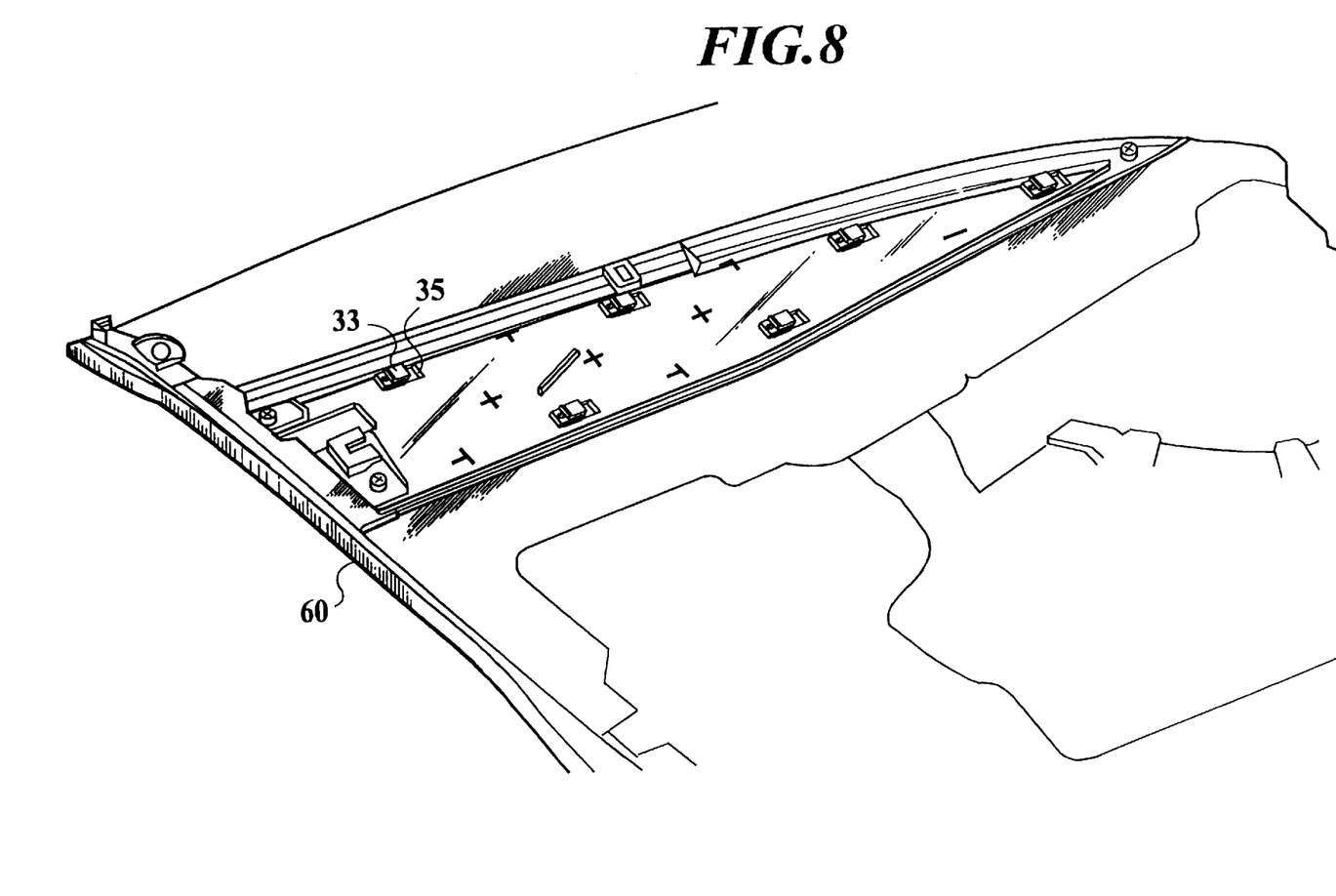
FIG. 8 is a partially rear view of the door lining or trim panel to which the door lining assembly or trim panel assembly according to the embodiment is attached.

FIG. 8 shows a partially rear view of the door lining or the trim panel 60 to which the door lining assembly or the trim panel assembly 40 is attached by the hooks 33 through the slide hole portions 35. The door lining assembly or the trim panel assembly 40 is fitted to the assembly attachment recess portion 63 of the door lining or the trim panel 60, so that the hooks 33 which project to a body side of the door lining assembly or the trim panel assembly 40 are projected to the body side of the door lining or the trim panel 60 through the slide hole portions 35. When the door lining assembly or the trim panel assembly 40 is slid in the front or the rear direction, the convex portions 33c of the "T" of the hooks 33 are fitted in the concave portions of the slide hole portions 35. Then, the hooks 33 are secured to the door lining or the trim panel 60 by self-tapping screw or welding staking.

As described above, according to the door lining assembly or the trim panel assembly 40 in the embodiment of the invention, because the cushion member is inserted into the inside of the bag-like member formed by the top cover 10 and the cardboard or the pasteboard 20, the advantages are that (1) it is possible to form the gathers 17 on the top cover 10 easily, (2) the work for assembling the top cover 10, the cardboard or the pasteboard 20, and the cushion member requires short time, (3) the tension of the top cover 10 can be uniform by the cushion member, (4) variation spread in the gathers 17 can be small, and (5) variation spread in the work for assembling the members can be small, so that it is possible to form the gathers 17 on the top cover 10 uniformly.

According to the embodiment as described above, the top cover comprises the natural leather. However, it is not limited to this, for example, artificial leather, cloth made of fibers, or the like can be also used for the top cover.

The materials of the base member, the cushion material, the attachment base, and the surface layer of the cushion member are not also limited to that in the embodiment.

As described above, according to the trim assembly, because after the upper part of the gather-sewn peripheral portion of the top cover is overlapped and sewn on the upper peripheral portion on the body side surface of the base member, the overlapped and sewn top cover is turned over upwardly and further turned over beyond the upper edge of the base member so as to face the room side surface of the base member, and the lower gather-sewn peripheral portion of the further turned top cover is overlapped and sewn on the lower peripheral portion on the room side surface of the base member, the lower peripheral portion of the base member can be turned back onto and fastened to the body side surface of the base member together with the sewn lower peripheral portion of the top cover. As the result, it is possible to form the gathers easily, and the work for assembling the trim assembly requires short time. Further, because the cushion member is inserted between the plate-like base member and the top cover, tension of the top cover is uniform thereby. Therefore, it is possible to uniformly form the gathers on the top cover.

According to the trim assembly, because the cushion member comprises the plate-like attachment base for securing the trim assembly to the body of the vehicle, it is possible to further obtain a benefit that the trim assembly can be attached to a door panel of the vehicle by using the attachment base.

According to the trim assembly, because the slippery layer which makes the top cover easy to slip is formed on the surface of the cushion material, the top cover can be slippery against the cushion member. As the result, it is possible to further obtain a benefit that it is possible to keep the uniformly formed gathers on the top cover.

According to the trim assembly, because the plate-like attachment base comprises the plurality of hooks for securing the trim assembly to the body of the vehicle, and the plurality of holes is formed in the base member for the hooks to project through the holes so as to secure the trim assembly to the body, it is possible to easily attach the trim assembly to the body of the vehicle by using the attachment base. Further, because the hooks comprise a shape like the "T", in cross section, it is possible to position the trim assembly to the body of the vehicle by easy operation.

According to the method for manufacturing the trim assembly, because after the upper part of the gather-sewn peripheral portion of the top cover is overlapped and sewn on the upper peripheral portion on the body side surface of the base member, the overlapped and sewn top cover is turned over upwardly and further turned over beyond the upper edge of the base member so as to face the room side surface of the base member, and the lower gather-sewn peripheral portion of the further turned top cover is overlapped and sewn on the lower peripheral portion on the room side surface of the base member, the lower peripheral portion of the top cover can be turned back onto and fastened to the body side surface of the base member. As the result, it is possible to form the gathers easily, and the work for assembling the trim assembly requires short time. Further, because the cushion member is inserted between the plate-like base member and the top cover, tension of the top cover is uniform thereby. Therefore, it is possible to uniformly form the gathers on the top cover.

According to the method for manufacturing the trim assembly, because the fold is previously formed on the base member to make the lower peripheral portion thereof easy to be turned back to the body side, it is possible to further obtain a benefit that it is possible to easily turn back the lower peripheral portion of the base member together with the lower peripheral portion of the top cover sewn thereto, to the body side along the fold.

According to the trim assembly, after the upper part of the peripheral portion of the top cover is overlapped and sewn on the upper peripheral portion on the body side surface of the base member, the overlapped and sewn top cover can be turned over upwardly and further turned over beyond the upper edge of the base member so as to face the room side surface of the base member and thereafter the lower gather-sewn peripheral portion of the further turned top cover can be overlapped and sewn on the lower peripheral portion on the room side surface of the base member. As the result, it is not required to be turned back the upper peripheral portion of the base member to the body side thereof. Therefore, it is possible to make the upper peripheral portion of the trim assembly thin and to make a step for manufacturing the trim assembly easy.

Obviously, many modifications and variations of the present invention in light of the above teaching may be made. It is, therefore, to be understood that, within the scope of the appended claims, the invention may be practiced otherwise than as specifically described.

The entire disclosure of Japanese Patent Application No. 10-149976 filed on May 29, 1998 including specification, claims, drawings and summary are incorporated herein by reference in its entirety.

What is claimed is:

1. A trim assembly for a vehicle comprising:
    a top cover comprising a gather-sewn peripheral portion;
    a plate base member, to which the peripheral portion of the top cover is sewn on a peripheral portion of the base member; and
    a cushion member inserted between the plate base member and the top cover;
    wherein an upper part of the gather-sewn peripheral portion of the top cover is overlapped and sewn on an upper peripheral portion on a body side surface of the base member, the overlapped and sewn top cover is turned over upwardly and further turned over beyond an upper edge of the base member so as to face a room side surface of the base member, a lower gather-sewn peripheral portion of the further turned top cover is overlapped and sewn on a lower peripheral portion on the room side surface of the base member, and the lower peripheral portion of the base member is turned back onto and fastened to the body side surface of the base member together with the sewn lower peripheral portion of the top cover.

2. A trim assembly for a vehicle as claimed in claim 1, wherein the cushion member comprises a plate attachment base for securing the trim assembly to a body of the vehicle, and a cushion material fastened to the attachment base.

3. A trim assembly for a vehicle as claimed in claim 1, wherein the cushion member comprises a cushion material, and a slippery layer which makes the top cover easy to slip on a surface of the cushion material.

4. A trim assembly for a vehicle as claimed in claim 2, wherein the cushion member further comprises a slippery layer which makes the top cover easy to slip on a surface of the cushion material.

5. A trim assembly for a vehicle as claimed in claim 2, wherein the plate attachment base comprises a plurality of hooks for securing the trim assembly to the body of the vehicle.

6. A trim assembly for a vehicle as claimed in claim 5, wherein each hook is shaped substantially like the letter "T", in cross section.

7. A trim assembly for a vehicle as claimed in claim 6, wherein a plurality of holes are formed in the base member for the hooks to project through the holes so as to secure the trim assembly to the body.

8. A method for manufacturing a trim assembly for a vehicle, comprising the steps of:
    gather-sewing a peripheral portion of a top cover;
    forming the top cover and a plate-like base member into a bag-like member by overlapping and sewing an upper part of the gather-sewn peripheral portion of the top cover on an upper peripheral portion on a body side surface of the base member, turning over the overlapped and sewn top cover upwardly and further turning over beyond an upper edge of the base member so as to face a room side surface of the base member, and overlapping and sewing a lower gather-sewn peripheral portion of the further turned top cover on a lower peripheral portion on the room side surface of the base member;

inserting a cushion member into an inside of the bag-like member;

turning back the lower peripheral portion of the base member onto the body side surface of the base member together with the sewn lower peripheral portion of the top cover; and fastening the turned back lower peripheral portion of the base member to the body side surface of the base member together with the sewn lower peripheral portion of the top cover.

9. A method as claimed in claim 8, further comprising a step for previously forming a fold on the base member to make the lower peripheral portion of the base member easy to be turned back to a body side, together with the lower peripheral portion of the top cover sewn thereto.

10. A trim assembly for a vehicle comprising:

a top cover comprising a gather-sewn peripheral portion;

a plate base member, to which the peripheral portion of the top cover is sewn on a peripheral portion of the base member; and a cushion member inserted between the plate base member and the top cover;

wherein an upper part of the gather-sewn peripheral portion of the top cover is overlapped and sewn on an upper peripheral portion on a body side surface of the base member, the overlapped and sewn top cover is turned over upwardly and further turned over beyond an upper edge of the base member so as to face a room side surface of the base member, a lower gather-sewn peripheral portion of the further turned top cover is overlapped and sewn on a lower peripheral portion on the room side surface of the base member.

* * * * *